(12) United States Patent
Beale

(10) Patent No.: US 9,322,189 B2
(45) Date of Patent: *Apr. 26, 2016

(54) SURFACE COMPOSITION AND METHOD OF APPLICATION

(75) Inventor: Lew Beale, Welshpool (AU)

(73) Assignee: HYDRAWALL PTY LTD, Welshpool (WA) (AU)

( * ) Notice: Subject to any disclaimer, the term of this patent is extended or adjusted under 35 U.S.C. 154(b) by 388 days.

This patent is subject to a terminal disclaimer.

(21) Appl. No.: 13/202,184

(22) PCT Filed: Feb. 23, 2010

(86) PCT No.: PCT/AU2010/000196
§ 371 (c)(1),
(2), (4) Date: Sep. 15, 2011

(87) PCT Pub. No.: WO2010/094080
PCT Pub. Date: Aug. 26, 2010

(65) Prior Publication Data
US 2011/0315064 A1 Dec. 29, 2011

(30) Foreign Application Priority Data
Feb. 23, 2009 (AU) .............................. 2009900767

(51) Int. Cl.
*B29C 37/00* (2006.01)
*B29C 41/02* (2006.01)
(Continued)

(52) U.S. Cl.
CPC ................ *E04H 4/14* (2013.01); *B29C 70/086* (2013.01); *B32B 33/00* (2013.01); *C09D 5/1662* (2013.01);
(Continued)

(58) Field of Classification Search
None
See application file for complete search history.

(56) References Cited

U.S. PATENT DOCUMENTS 3,449,276 A  6/1969  Rabenold et al.
4,086,118 A  4/1978  Dewey
(Continued)

FOREIGN PATENT DOCUMENTS

EP  0400884  12/1990
FR  2613980 A1  10/1988
(Continued)

OTHER PUBLICATIONS

"Clarity—Freedictionary.com" (http://thefreedictionary.com/p/clarity) (webpage retrieved Oct. 28, 2014).*
"Clear—Freedictionary.com" (http://thefreedictionary.com/p/clear) (webpage retrieved Oct. 28, 2014).*
Whelan, Tony—Polymer Technology Dictionary—"pigment" entry, p. 305 (1994).*
Evercoat (Gel Coat, Illinois Tool Works Inc. retrieved Feb. 21, 2013, pp. 1-4).

(Continued)

*Primary Examiner* — Vivian Chen
(74) *Attorney, Agent, or Firm* — Volpe and Koenig, P.C.

(57) ABSTRACT

There is provided a surface composition for reducing degradation and fading of surfaces subjected to extended periods of submersion in an aqueous liquid. The surface composition comprises at least one clear barrier layer and at least one under layer, wherein the clear barrier layer is in use, disposed atop the under layer and in contact with the aqueous liquid whereby the clear barrier layer protects the structure and appearance of the under layer. The surface composition is particularly useful in applications where the surface is subjected to extended periods of submersion in liquids containing hydrolyzing or oxidizing agents, exposure to ultra violet radiation, or combinations thereof, whereby the clear barrier layer provides structural protection against degradation from chemical attack and from fading due to UV exposure. There is also provided a method of manufacturing a boat or other watercraft surface composition.

18 Claims, 14 Drawing Sheets

(51) Int. Cl.

| | | |
|---|---|---|
| B29C 41/22 | (2006.01) | |
| B29C 70/30 | (2006.01) | |
| C09D 5/16 | (2006.01) | |
| C09D 135/00 | (2006.01) | |
| C09D 167/00 | (2006.01) | |
| C09D 167/02 | (2006.01) | |
| C09D 167/03 | (2006.01) | |
| C08K 5/101 | (2006.01) | |
| C08K 5/17 | (2006.01) | |
| C08K 5/3492 | (2006.01) | |
| C08K 5/56 | (2006.01) | |
| B32B 7/02 | (2006.01) | |
| B63B 5/24 | (2006.01) | |
| E04H 4/14 | (2006.01) | |
| B29C 70/08 | (2006.01) | |
| B32B 33/00 | (2006.01) | |
| C09D 7/12 | (2006.01) | |
| C09D 167/06 | (2006.01) | |
| C09D 167/07 | (2006.01) | |
| C09F 9/00 | (2006.01) | |
| E04H 4/00 | (2006.01) | |
| C09D 5/32 | (2006.01) | |
| B32B 27/12 | (2006.01) | |
| B32B 27/18 | (2006.01) | |
| B32B 27/20 | (2006.01) | |
| B32B 27/26 | (2006.01) | |
| B32B 27/30 | (2006.01) | |
| B32B 27/36 | (2006.01) | |
| B29K 31/00 | (2006.01) | |
| B29K 67/00 | (2006.01) | |
| C08L 67/00 | (2006.01) | |
| C08L 35/02 | (2006.01) | |
| C08L 67/02 | (2006.01) | |
| B29K 105/00 | (2006.01) | |
| C08L 67/03 | (2006.01) | |
| C08K 5/00 | (2006.01) | |
| B32B 17/04 | (2006.01) | |
| C09D 135/02 | (2006.01) | |
| C08K 5/098 | (2006.01) | |
| B63B 35/79 | (2006.01) | |

(52) U.S. Cl.
CPC .......... *C09D 5/1693* (2013.01); *C09D 5/32* (2013.01); *C09D 7/1241* (2013.01); *C09D 167/02* (2013.01); *C09D 167/06* (2013.01); *C09D 167/07* (2013.01); *C09F 9/00* (2013.01); *E04H 4/00* (2013.01); *E04H 4/0037* (2013.01); *B29C 37/0032* (2013.01); *B29C 41/02* (2013.01); *B29C 41/22* (2013.01); *B29C 70/30* (2013.01); *B29C 2037/0035* (2013.01); *B29K 2031/00* (2013.01); *B29K 2067/00* (2013.01); *B29K 2105/0014* (2013.01); *B29K 2105/0044* (2013.01); *B29K 2105/0061* (2013.01); *B32B 7/02* (2013.01); *B32B 17/04* (2013.01); *B32B 27/12* (2013.01); *B32B 27/18* (2013.01); *B32B 27/20* (2013.01); *B32B 27/26* (2013.01); *B32B 27/30* (2013.01); *B32B 27/36* (2013.01); *B32B 2262/101* (2013.01); *B32B 2305/07* (2013.01); *B32B 2307/71* (2013.01); *B32B 2331/00* (2013.01); *B32B 2367/00* (2013.01); *B32B 2605/12* (2013.01); *B63B 5/24* (2013.01); *B63B 35/7909* (2013.01); *C08K 5/005* (2013.01); *C08K 5/0008* (2013.01); *C08K 5/0025* (2013.01); *C08K 5/098* (2013.01); *C08K 5/101* (2013.01); *C08K 5/17* (2013.01); *C08K 5/3492* (2013.01); *C08K 5/56* (2013.01); *C08L 67/00* (2013.01); *C08L 67/02* (2013.01); *C08L 67/03* (2013.01); *C09D 135/02* (2013.01); *C09D 167/00* (2013.01); *Y10T 428/24802* (2015.01); *Y10T 428/31511* (2015.04); *Y10T 428/31786* (2015.04); *Y10T 428/31797* (2015.04); *Y10T 428/31935* (2015.04)

(56) References Cited

U.S. PATENT DOCUMENTS

| | | | | |
|---|---|---|---|---|
| 4,244,993 | A * | 1/1981 | Platka et al. | 428/15 |
| 4,307,003 | A | 12/1981 | Niswonger | |
| 4,310,644 | A * | 1/1982 | Miley | 525/507 |
| 4,446,177 | A * | 5/1984 | Munoz et al. | 428/15 |
| 4,551,290 | A * | 11/1985 | Mizell | 264/46.6 |
| 4,724,173 | A * | 2/1988 | Rockett et al. | 427/389.8 |
| 4,740,542 | A | 4/1988 | Susi | |
| 4,959,259 | A * | 9/1990 | Guilbaud | 428/215 |
| 5,051,511 | A * | 9/1991 | Seltzer et al. | 546/242 |
| 5,087,045 | A | 2/1992 | Kim | |
| 5,164,127 | A * | 11/1992 | Boeckeler | 264/447 |
| 5,476,895 | A | 12/1995 | Ghahary | |
| 5,601,049 | A * | 2/1997 | Hordis et al. | 114/357 |
| 5,874,503 | A * | 2/1999 | Scheibelhoffer et al. | 525/168 |
| 5,883,164 | A * | 3/1999 | Katoot | 524/104 |
| 5,935,683 | A * | 8/1999 | Iiyama et al. | 428/141 |
| 6,116,181 | A | 9/2000 | Kalamaras | |
| 6,153,682 | A * | 11/2000 | Bannat et al. | 524/492 |
| 6,207,077 | B1 * | 3/2001 | Burnell-Jones | 252/301.36 |
| 6,268,464 | B1 * | 7/2001 | Keinanen et al. | 528/272 |
| 6,314,906 | B1 | 11/2001 | Tesfaye | |
| 6,818,153 | B2 * | 11/2004 | Burnell-Jones | 252/301.36 |
| 6,905,634 | B2 * | 6/2005 | Burnell-Jones | 252/301.36 |
| 7,252,727 | B2 * | 8/2007 | DeTurris | 156/94 |
| 8,210,953 | B1 * | 7/2012 | Dankewich | B29C 70/086 472/116 |
| 2002/0000290 | A1 * | 1/2002 | Crump et al. | 156/245 |
| 2002/0195742 | A1 * | 12/2002 | Beck | B29C 37/0032 264/247 |
| 2003/0039840 | A1 * | 2/2003 | Beck | B29C 37/0032 428/423.1 |
| 2004/0028909 | A1 * | 2/2004 | Hodgson et al. | 428/413 |
| 2004/0168622 | A1 * | 9/2004 | Thompson et al. | 114/55.5 |
| 2004/0185231 | A1 | 9/2004 | Dimmick | |
| 2005/0159551 | A1 * | 7/2005 | Mack et al. | 525/165 |
| 2006/0196404 | A1 * | 9/2006 | Gulden | 114/355 |
| 2010/0083893 | A1 * | 4/2010 | Staerzl | 114/382 |
| 2011/0078851 | A1 * | 4/2011 | Beale | 4/488 |

FOREIGN PATENT DOCUMENTS

| | | |
|---|---|---|
| FR | 2876319 | 4/2004 |
| FR | 2876319 A1 | 4/2006 |
| JP | 01-230865 | 9/1989 |
| JP | 1230865 A | 9/1989 |
| JP | 02-058670 | 2/1990 |
| JP | 2058670 A | 2/1990 |
| JP | 10296175 A2 | 11/1998 |
| JP | 2000070849 A2 | 3/2000 |
| JP | 2003-034011 | 2/2003 |
| JP | 2003034011 A | 2/2003 |
| JP | 2003-239493 | 8/2003 |
| JP | 2003239493 A | 8/2003 |
| JP | 2006056975 A2 | 3/2006 |
| WO | 2008015308 A1 | 2/2008 |

OTHER PUBLICATIONS

"Polyesters, Unsaturated," Kirk-Othmer Encyclopedia of Chemical Technology, (Dec. 2000), 34 pages.

\* cited by examiner

FIGURE 1

FIRST LAYER
CLEAR BARRIER GELCOAT

SECOND LAYER
PIGMENTED GELCOAT 0.65mm WET FILM
THICKNESS MINIMUM

THIRD AND SUBSEQUENT
CHEMICAL RESISTANT AND
STRUCTURAL LAYERS

FIRST LAYER: CLEAR ISOPHTHALIC NPG GELCOAT APPLIED AT 0.65mm WET FILM THICKNESS

SECOND LAYER: COMBINATION OF CLEAR VINYLESTER GELCOAT BLENDED AND MIXED WITH PIGMENTS, COLOURED PARTICLES, CHIPS, MICA, HOLOGRAPHIC GLITTER AND METAL FLAKE, APPLIED TO PROVIDE APPROPRIATE COVERAGE WITHOUT DRAPING, FISH EYING OR PRE-RELEASE. CONDITIONS APPLY TO APPLICATION.

THIRD LAYER: ADDITIONAL CHEMICAL AND STRUCTURAL LAYERS TO ENGINEERS SPECIFICATIONS TO SUIT APPLICATION. CONDITIONS APPLY TO APPLICATION

SURFACE COMPOSITION AND METHOD OF APPLICATION

FIELD OF THE INVENTION

The present invention relates to a surface composition for use in protecting surfaces subjected to periods of exposure to an aqueous environment from degradation and fading, such as protecting a surface layer finish of boats and other watercraft. The present invention also relates to a method of application of a surface composition and to products manufactured therefrom.

BACKGROUND TO THE INVENTION

Fibre reinforced plastic (FRP) boat hulls conventionally have a smooth outer gelcoat layer and a structural layer made up of fibres, usually glass fibres, embedded in a resin, most usually a polyester resin. In some cases a foam or timber core is encapsulated between two reinforced fibre layers. The gelcoat and resin are initially liquids which are mixed with a hardener (catalyst) and applied within a mould in liquid state. After application, the liquids cure to the solid state.

After prolonged exposure to a marine environment, a number of boat hulls are found to suffer blistering which appears on the outer gelcoat surface. It appears that this is caused by a build up of fluid between the gelcoat layer and the fibre/resin layer. The damage can result from one or more of the following: water penetration; degradation reactions resulting from water penetration; deterioration resulting from faulty manufacture; deterioration resulting from faulty materials used in the moulding process; deterioration resulting from failed bonding or de-lamination of foam or timber cores; de-lamination of the moulding. The symptoms of such damage are often attributed to osmosis.

A layer of antifouling paint is usually applied to the gelcoat layer. The antifouling paint comprises substances that prevent or hinder the attachment of algae, microorganisms, barnacles etc, to the lower hull; this is necessary because foreign elements attached to the lower hull hinder the flow of water along the hull, so worsening the nautical characteristics (speed and maneuverability) of the boat.

Regardless of the surface finish selected, it is common to all fibreglass boats or other watercraft that once in service, surfaces are either totally immersed in or partially exposed to water. In some cases, the water may never completely be removed and remains in contact with the outside surfaces of the watercraft at all times. This inevitably creates a two-fold problem. The first is that the water itself is a harsh solvent capable of dissolving any water soluble material (WSM) and hydrolysing any of the water soluble components used in manufacture of the watercraft.

The second problem is that water, particularly saltwater is an extremely corrosive environment.

The salts present in a marine environment eventually cause bleaching and degradation of the watercraft surface. Over time, there are usually clear signs of fading and deterioration of the watercraft surface which significantly detracts from the aesthetic appearance of the craft. Fading and deterioration problems are increased by a variety of other factors such as:
 a) exposure to UV light;
 b) neglect and mismanagement of the watercraft;
 c) elevation of water temperature.

Despite these problems, consumer expectations demand a product which can withstand degradation and importantly, retain the original colour for extended periods of time and without necessitating costly and time consuming stripping and refurbishing of the watercraft surface or even replacement of the watercraft itself, which are the only permanent and consumer acceptable remedies once significant degradation of the watercraft surface has occurred. Similarly, manufacturers of watercraft, who generally provide some degree of guarantee with watercraft, do not wish to become liable for repair or replacement if the watercraft surface cannot withstand degradation for a prescribed period of time.

Since the problem of surface degradation, including colour fading, is such a widespread problem, there have been various attempts to remedy or at least alleviate the problem. Such remedies include producing watercraft in colours such as white, creams or very pale blue colours that simply show only minimal effects of fading. The unfortunate outcome of such a remedy is that colour and finishing options then become severely limited.

Some success has been achieved by the application of the colour and decorative surface finish in a polyester gelcoat, the gelcoat having some UV resistant properties. However, although known gelcoats are able to offer a certain degree of resistance and longevity to the surface appearance, after about 6 to 10 years, the surface finish pigment inevitably starts to fade and the appearance of the surface of the watercraft becomes compromised and looks washed out.

Further, whilst it may at first seem a viable solution to protect the aesthetic, particularly the colour, qualities of the watercraft surface with the application of an additional protective or barrier layer, to date no such application has been successful in the unique circumstances of watercraft, where the watercraft surface is subject to prolonged periods of exposure to an aqueous environment.

There is therefore a need for a product which can prevent discolouration and degradation of the watercraft surface finish without compromising the availability of selection of colours and finishes.

SUMMARY OF THE INVENTION

According to a first aspect of the present invention there is provided a surface composition for reducing degradation and fading of surfaces subjected to extended periods of submersion in an aqueous liquid, the surface composition comprising at least one clear barrier layer and at least one under layer, wherein the clear barrier layer is in use, disposed atop the under layer and in contact with the aqueous liquid whereby the clear barrier layer protects the structure and appearance of the under layer.

The surface composition is particularly useful in applications where the surface is subjected to extended periods of exposure to liquids containing hydrolysing or oxidising agents, exposure to ultra violet radiation, or combinations thereof, whereby the clear barrier layer provides structural protection against degradation from chemical attack and from fading due to UV exposure.

In a particularly preferred embodiment of the invention, the under layer is a decorative layer, containing one or more decorative or ornamental agents provided to impart a desired visual or aesthetic appearance. The decorative or ornamental agents can include, but are not limited to, pigments, particles and chips.

The surface composition finds particular application in the creation of a surface finish to watercraft such as boats, ships, canoes, kayaks, rafts, barges, catamarans, yachts, hydrofoils, windsurfers, surfboards, water skis, jet skis, underwater robots or seaplanes; particularly fibre reinforced plastic (FRP) boats and other watercraft.

The surface composition provides strong interlaminar bonding between the barrier layer and the under layer. As such, the surface composition of the invention advantageously minimises delamination and prevents osmotic blistering.

In one embodiment the composition comprises one or more UV inhibitors, absorbers and/or stabilisers. Preferably, the clear barrier layer comprises one or more UV inhibitors, absorbers and/or stabilisers.

In another embodiment the clear barrier layer is a clear polyester gelcoat. Preferably, the clear polyester gelcoat comprises one or more phthalate containing polyesters, vinyl containing polyesters or methyl methacrylate containing polyesters. More preferably, the clear polyester gelcoat comprises a phthalate containing polyester particularly a phthalate containing polyester derived from an isophthalic neopentyl glycol (iso-NPG).

The iso-NPG is advantageously combined with additives, including promoters and UV inhibitors/absorbers, which are added prior to application of the iso-NPG to a boat or other watercraft mould.

In one embodiment the barrier layer comprises a triazine based UV absorber. Additionally or alternatively the barrier layer comprises a hindered amine light stabiliser.

In a yet further embodiment the barrier layer comprises one or more metal promoters preferably one or more metal promoters selected from the group consisting of zinc octoate, potassium octoate or cobalt octoate. Particularly preferred promoters are a mixture of zinc octoate and potassium octoate.

The under layer comprises one or more polyesters, vinyl esters or terephthalate based resins. Preferably the under layer comprises one or more epoxy vinyl esters, brominated epoxy vinyl esters, novolac epoxy vinyl ester resins or elastomer modified vinyl ester resins. A particularly preferred under layer is an epoxy vinyl ester resin comprising a bisphenol-A epoxy vinyl ester resin.

In one embodiment the under layer comprises one or more metal promoters.

The under layer is provided with decorative additives such as pigments, which can include organic or inorganic pigments and optionally, other decorative elements, such as small chips or particles, so as to impart a granite, marble, crystalline or quartz appearance.

According to a further aspect of the present invention, there is provided a method of manufacturing a surface composition, the method comprising applying an under layer, wherein the under layer is as described in any of the aforementioned embodiments, to a suitable surface, permitting the under layer to cure and subsequently applying a clear barrier layer, wherein the clear barrier layer is as described in any of the aforementioned embodiments.

According to a yet further aspect of the present invention, there is provided a method of manufacturing a surface composition, comprising application of a clear barrier layer, wherein the clear barrier layer is as described in any of the aforementioned embodiments, to a mould, permitting the barrier layer to cure and subsequently applying an under layer, wherein the under layer is as described in any of the aforementioned embodiments, to the cured barrier layer.

In a preferred embodiment of this aspect of the invention the mould is a mould of a watercraft, particularly the mould of a watercraft hull.

According to a still further aspect of the present invention there is provided a use of a surface composition according to any of the aforementioned embodiments in the manufacture of a boat or other watercraft. In one embodiment of this aspect of the invention the entire hull may comprise the inventive surface composition. Alternatively, only that part of the hull which is above the waterline may comprise the inventive surface composition. Alternatively and/or additionally those parts of the watercraft that may be exposed periodically to water, for example, via splashing may comprise the inventive surface composition. The part of the hull below the waterline may, if desired, be further treated with an antifouling paint.

In one embodiment of this aspect of the invention the watercraft is at least in part a fibreglass reinforced plastic watercraft.

According to a still further aspect of the invention there is provided a watercraft, said watercraft having a surface composition comprised of at least one clear barrier layer, wherein the clear barrier layer is as described in any of the aforementioned embodiments, and at least one under layer, wherein the under layer is as described in any of the aforementioned embodiments, and wherein the clear barrier is in use, disposed atop the under layer, whereby the clear barrier layer protects the under layer from degradation. In one embodiment of this aspect of the invention the entire hull of the watercraft may comprise the inventive surface composition. Alternatively, only that part of the hull of the watercraft which is above the waterline may comprise the inventive surface composition. Alternatively and/or additionally those parts of the watercraft that may be exposed periodically to water, for example, via splashing may comprise the inventive surface composition. The part of the hull of the watercraft below the waterline may, optionally be treated with an antifouling paint.

In one embodiment of this aspect of the invention the watercraft is at least in part a fibreglass reinforced plastic watercraft.

Exemplary watercraft include, but are not limited to, a boat, ship, canoe, kayak, raft, barge, catamaran, yacht, hydrofoil, windsurfer, surfboard, water skis, jet skis, underwater robot or seaplane.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

BRIEF DESCRIPTION OF THE FIGURES

The present invention will now be described with reference to the accompanying Figures, where:

FIG. 1 is a simplified diagram of layers of a surface composition according to the present invention;

DETAILED DESCRIPTION OF AN EMBODIMENT OF THE INVENTION

Figure 2:
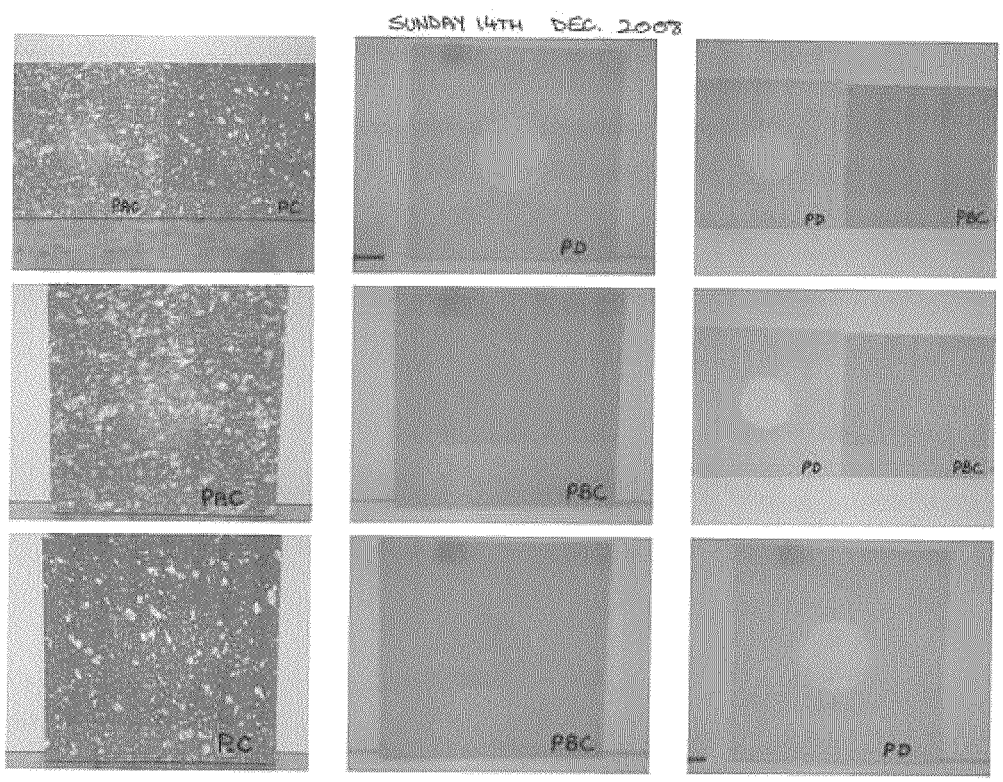
FIG. 2 is a photograph comparing effect of submersion and chemical exposure on a panel of FRP of known surface composition and of a surface composition of the present invention.

The present invention as described hereafter is a description of preferred embodiments of the invention and should be understood as being a description for purposes of demonstrating non-limiting examples of possible embodiments of the invention. The embodiments and examples described do not define the overall broader scope of the invention.

The surface composition of the present invention finds particular application in the creation of a surface finish or layer in FRP boats and other watercraft, in which the surface is submersed within and in direct contact with water, particularly water containing hydrolysing and/or oxidising agents, such as from salt water, for prolonged periods of time. The surface composition has the primary object of not only maintaining structural integrity of the FRP product whilst immersed in water, but also of protecting decorative elements such as pigmentation, from damage or fading caused by prolonged exposure to water, chemicals and UV radiation.

The surface composition includes a clear barrier gelcoat surface layer which is in use, in direct contact with the water and any chemicals that the water may contain. The purpose of the clear barrier layer is to protect the second gelcoat layer, this second, or decorative layer containing decorative components or additives, such as pigmentation and chips or particles, from degradation by the water, chemicals and UV light. That is, the clear barrier layer, applied to a boat or watercraft mould prior to application of the second, decorative or coloured gelcoat layer, has the purpose of protecting the decorative qualities within the second layer, the maintenance of which is essential in preserving the cosmetic or aesthetic qualities of the boat or other watercraft.

To date, there has been no successful application of a clear barrier layer to protect the qualities of a decorative under layer in the unique circumstances where the surface is subjected to prolonged periods of submersion and also often to prolonged UV radiation exposure. One of the main reasons as to why a clear gelcoat has not been successfully applied prior to the application of a second coloured gelcoat is that the application of two like gelcoat substances on top of each other will eventually fail when fully submersed in water and subjected to hydrolysis and osmotic pressure. Compounding the problem, the required heavy use of pigments and physical reagents prevents adequate bonding between the two surfaces. In previous attempts, osmotic blisters have developed at the interface of the two layers which not only detracts from the aesthetic quality of the boat or other watercraft but compromises structural integrity. To date, application of a clear polyester gelcoat over another, coloured or decorative polyester gelcoat has failed in any application to boat or other watercraft surfaces.

In other attempts, which have sought to use different materials, the inherent qualities of the selected materials, whilst possessing structural qualities suitable and necessary for use in a boat or other watercraft surface composition, have partly contributed to the failures. Base resins used to make gelcoats are often themselves not clear since the manufacturing process imparts a brown coloured quality to the resin. Further, the promoters or accelerators necessary for curing the resin at room temperature are generally cobalt based, which are purple in colour and therefore also alter the colour of the final resin. Also, the actual process of catalysation and setting of the resin similarly changes the colour. In short, once the resins are processed for spraying, they are no longer clear. It is generally undesirable to manufacture boats or other watercraft having surfaces of such colours. In any event, use of resins which turn brown or purple prevent the use of the full array of colours and cosmetic effects that are available and desired by the consumer.

Some other attempts at providing a clear protective layer over the coloured layer have failed since the clear layer, once exposed to UV light, turns opaque or cloudy and the clarity of the protective layer is permanently lost.

The composition of the present invention has solved these issues by utilisation of specific components and additives in each of the clear barrier layer and the coloured, decorative layer located underneath.

In the presently described embodiment of the invention, the clear barrier layer of the surface composition of the present invention is provided as a clear polyester gelcoat such as a clear isophthalic neopentyl glycol (iso-NPG). Preferably, the iso-NPG is a high quality, high molecular weight iso-NPG. A non-limiting example of a suitable iso-NPG is the commercially available Cray Valley (Cray Valley Korea Co. Ltd) formulated gelcoat, Polycor GPLY 9107-011, which is an unsaturated polyester resin in styrene monomer.

Whilst this is a preferred composition for the clear barrier layer, it is envisaged that a selection of other suitable products can also be used, such as, but not limited to, clear orthophthalic NPG based gelcoat, clear orthophthalic gelcoat, clear vinyl ester gelcoat or clear methyl methacrylate modified gelcoat.

Specific additives are added to the unpromoted iso-NPG to impart the qualities needed to protect the second, decorative layer. In this embodiment, the additives include specific promoters and UV inhibitors and/or UV absorbers.

The specific choice of added promoters (accelerators) is one of the chief factors in the success of the application of the clear barrier gelcoat layer and its inclusion in the present surface composition. It is usual in the art of FRP boat or other watercraft manufacture, that the promoter of choice is cobalt based, namely cobalt octoate, which is purple in colour. The addition of this component alone is sufficient to alter the colour of the resin, making it less than clear.

In the present invention, mixed metal promoters are added to the iso-NPG. Preferred metal promoters are zinc octoate (6%) and potassium octoate (12%), which, on being added to the iso-NPG, do not alter the colour. Further, even on catalysation and curing, they do not alter the clarity of the gelcoat.

Whilst zinc octoate and potassium octoate are preferred promoters, it is probable that others may also be suitable. Other products that can suitably be used in the process include, but are not limited to, SHEN catalyst PC-6, EFKA-2020 defoaming agent, dimethyl aniline and some small amounts of cobalt octoate (6%).

The selection of added promoters is important also in that the particular selection of mixed metal promoters have solved curing difficulties with the application of iso-NPG. Iso-NPG's, whilst having physical qualities that are ideal for the present application, being known to be more hydrolytically stable than other resins such as orthophthalic resins, are more difficult to apply and more difficult to process. For at least this reason, iso-NPGs have been considered as unsuitable for purposes of providing a clear barrier gelcoat or indeed, even for general widespread application in creation of FRP boats or other watercraft. High molecular weight iso-NPG's are more reactive and are prone to shrinkage from the mould if applied too thickly, or are over catalysed or promoted, or sprayed in less than ideal conditions. However, the selection of the mixed metal promoters such as zinc octoate and potassium octoate have overcome curing problems and permitted the creation of a clear layer having a strong positive cure.

So that the clear barrier gelcoat advantageously has qualities that will protect the coloured gelcoat layer from UV fading, at least one UV inhibitor and/or absorber or a light stabiliser is also added to the iso-NPG. In this particular embodiment, two UV absorbers are added, known commercially under the trade marks Tinuvin™ and Chimasorb™, each produced by Ciba™ Specialty Chemicals Inc. Preferred blends are Tinuvin™ 384-2 and Chimasorb™ 119FL. Particularly preferred blends are Tinuvin™ 400 and Tinuvin™ 123. These UV absorbers and stabilisers act to improve the resistance of the clear barrier gelcoat to UV exposure failures such as discolouration, cracking and fading.

Further additives are added to the iso-NPG as required, such as thixotropic agents. Selection of thixotropic agent is not of itself critical for the present surface composition to work, only to make the uncured components appropriately sprayable, which is necessary for the method of application of iso-NPG in creation of FRP boats and other watercraft known to the art. However, the thixotropic agent should be hydrophobic, so as to repel moisture. Elimination of moisture is necessary to maintain the clarity of the clear barrier gelcoat, since moisture will cause the gelcoat to become misty and detract from the aesthetic qualities.

The combination of specific components as described above advantageously provides a clear barrier gelcoat that can be sprayed onto the boat or other watercraft mould prior to the application of the second coloured gelcoat. The combination of components is clear prior to application and remains clear after application and curing. However, the successful creation of the clear barrier gelcoat cannot be successful in the intended application as a boat or other watercraft surface composition unless it also facilitates application of the second coloured gelcoat without wrinkling of the clear coat. It is also necessary that a strong interlaminar bond between the first and second gelcoats be created so as to eliminate possibility of delamination between the adjacent gelcoat layers.

In order to achieve these advantages and arrive at the surface composition of the present invention, the composition of the second coloured gelcoat is critical. In the present embodiment, the second colour gelcoat is comprised essentially of a vinyl ester resin.

Vinyl ester resins have properties which advantageously lend themselves to the present application, in that they are extremely strong, have great hydrolytic stability, offer excellent tensile and flexural strengths and have a high heat distortion temperature and are therefore able to resist osmotic blistering. In addition, they have excellent adhesive and bonding characteristics and are very chemically resistant. However, despite having these qualities, vinyl esters have never been used as a carrier for decorative agents such as pigment and texturising agents in boat or other watercraft surface compositions or in any application where the surface is exposed to water for prolonged periods. Vinyl esters are known to degrade when subjected to constant water submersion and continuous UV radiation. As such, any gelcoat made from a vinyl ester and applied to a boat or other watercraft surface will change colour on manufacture, on application and particularly after aging and exposure to water and UV light.

Further, vinyl esters have been thought to be inherently unsuitable for application in boat or other watercraft surfaces due to the fact that when used as a gelcoat, they characteristically cure softer than a polyester resin. That is, using a Barber Coleman impresser to test for Barcol hardness, a vinyl ester resin can test at about 25% lower than the hardness of an iso-NPG or ortho-NPG based gelcoat. As such, despite having many positive attributes, vinyl ester gelcoats are generally unable to withstand the rigors of boat or watercraft usage, particularly from abrasion from a marine environment, cleaning products and cleaning methods.

However, the concept of the present invention, where the pigmented vinyl ester is protected from exposure to such elements by the clear barrier gelcoat, solves these difficulties and permits the advantageous qualities of the vinyl ester to be employed in the present application.

The vinyl ester resin selected for the present invention is one that is formulated to be clear and importantly, not show the distinguishing brown tones of conventional vinyl ester resins. Standard vinyl ester resins are brown and thus do not provide a good base for application of the available variety of different pigmentations. Since one of the objectives of the present invention is to permit the use of not only standard colours in boats and other watercrafts, but an expanded array of colours as well as culturing and texturizing of colours with the addition of small chips or particles, it is desirable that the vinyl ester selected can remain as clear as possible, even after application and curing. Therefore, whilst it is not necessary that the vinyl ester resin remain as clear as the clear barrier gelcoat, a dark vinyl ester will have the effect of overpowering the effect of some colours and also of chips and particles and is therefore undesirable. The base vinyl ester is therefore preferably maintained as clear as possible, even after application and curing.

A non-limiting example of a vinyl ester that has been found to be suitable for application in the present invention is bisphenol-A epoxy vinyl ester resin, such as Cray Valley Epovia Kayak™ KRF-1001MV, which is a clear transparent liquid resin. Any suitable vinyl ester can be utilised, as long as it is able to provide excellent cure of the vinyl ester gelcoat and can enable the coexistence of the highly water and chemical resistant vinyl ester resin behind the clear barrier gelcoat.

Similarly to selection of the composition for the clear barrier gelcoat, it is envisaged that other products may also be suitable for use in the coloured gelcoat layer. Possible non-limiting examples are a selection of polyester, vinyl ester or terephthalate based resins or gelcoats that can incorporate pigments and/or texturising components, including any bisphenol-A epoxy vinyl ester resin, brominated epoxy vinyl ester resin, novolac epoxy vinyl ester resin or elastomer modified vinyl ester resin.

As with the iso-NPG, the selection of additives added to the vinyl ester is significant for imparting desired qualities to the overall surface composition. In order to maintain the near clear qualities of the vinyl ester, it is desirable to again avoid the use of cobalt octoate as a promoter. It is again preferred that mixed metal promoters be used, such as zinc octoate and potassium octoate. However, further examples of suitable additives include Shen Catalyst PC-6, dimethyl aniline, EFKA-2020 defoaming agent and styrene monomers. In applications where the final colour of the coloured layer is relatively dark, it may be appropriate to add cobalt octoate (6% and 8%).

A suitable thixotropic agent is also added to enable sprayability.

The present invention also includes a method of manufacture of a surface composition and manufacture of a FRP product, such as a boat or other watercraft. The method essentially comprises the application of a clear polyester gelcoat liquid, in this case, the clear high molecular weight iso-NPG, to the surface of a mould. The iso-NPG, containing additives as described above, is sprayed evenly onto the mould in a manner known to the art, achieving a minimal wet thickness of 0.65 mm. The cured gelcoat preferably achieves a minimum Barcol hardness of 35 within 24 hours of application. As such, the clear barrier layer is able to provide the durability and abrasion resistance to withstand normal daily use of the boat or other watercraft even in the harshest of marine environments.

Once the iso-NPG has appropriately cured so as to form the clear barrier layer, the vinyl ester, in this case, bisphenol-A epoxy vinyl ester resin, with additives as described above, is sprayed onto the gelcoated mould to give the product its coloured and optionally, textured appearance. The vinyl ester is then also permitted to cure as required.

Further structural and chemical and/or corrosion barrier layers are added as required and as dictated by the specific intended use of the product. For example, in manufacture of a boat or other watercraft, further layers may comprise a further vinyl ester corrosion barrier to improve impact resistance and thermal insulation, an isophthalic corrosion and structural layer, fibreglass lamination and also further reinforcing layers. The cured finished product is released from the mould, trimmed and transported to its place of service.

The creation of a product, such as a boat or other watercraft, with the surface composition of the present invention confers quality and resilience of product that has not yet been achieved in the art. The present surface composition provides a clear barrier layer or gelcoat that will not discolour or fail under the harmful effects of UV radiation, such as is experienced when the boat or other watercraft is situated outdoors and therefore exposed to long periods of sunlight, or the combination of water and the chemicals present in a marine environment. Further, this clear barrier layer provides such an increased degree of protection that the second coloured or decorative layer disposed beneath can last for even longer periods of time than previously possible without fade or discolouration of pigmentation. Importantly, the degree of protection conferred by the clear barrier layer is such that a wider range of pigments can be employed in the coloured layer. That is, organic pigments, which would otherwise be destroyed or compromised upon exposure particularly to UV and oxidising agents, can be included in the coloured gelcoat layer.

It is proposed that application of the surface composition according to the present invention in boats and other watercraft and the like will permit manufacturers to offer consumers longer guarantee of product without risking themselves to paying for boat or other watercraft refurbishments and replacements. That is, the products will look better and retain their new and vibrant appearance for much longer periods of time.

The durability and resilience of the surface composition of the present invention is evidenced by experimental data, testing the resistance of the surface composition to chemical degradation, as set out below:

EXAMPLES

Example 1

Chlorine Discolouration Tests

A series of tests were conducted on panels of fibreglass reinforced plastic (FRP), manufactured using known manufacturing techniques, procedures and formulations, as applicable to FRP manufacture, in order to compare the effectiveness of a known surface composition with the surface composition according to embodiments of the present invention.

A series of square panels, measuring approximately 200 mm×200 mm were cut from two variations of FRP with a known surface composition (control panels) and also from two variations of FRP having the surface composition of an embodiment of the present invention applied thereon. The variations are as recited in Table 1 below:

TABLE 1

| Panel Types and Identification | | | | |
|---|---|---|---|---|
| Panel Code | Barrier Layer | Under Layer | Colour/Effect | Control or Test |
| PAC | isophthalic neopentyl glycol | bisphenol-A epoxy vinyl ester resin | "Paramount" (marblestone effect) | Test |

TABLE 1-continued

| Panel Types and Identification | | | | |
|---|---|---|---|---|
| Panel Code | Barrier Layer | Under Layer | Colour/Effect | Control or Test |
| PBC | isophthalic neopentyl glycol | bisphenol-A epoxy vinyl ester resin | "Light sapphire blue" (light blue colour, no textured effect) | Test |
| PC | isophthalic neopentyl glycol | None | "paramount" (marble stone effect) | Control |
| PD | isophthalic neopentyl glycol | None | "light sapphire blue" (light blue colour, no textured effect) | Control |

Each panel was placed in a separate tank of water and a chlorine generating trichlorisocyanurate tablet was placed in direct contact with the surface of each panel, with both panel and tablet being fully submerged in the water. The tablet was placed directly on each panel to simulate the effect of many years degradation and bleaching of a boat or other watercraft surface by water and disinfectant. The tablet in each tank was weighed down to prevent migration of the tablet across the surface of the panel due to the release of gases and surface interactions.

The water in each tank was emptied daily and replaced with clean fresh tap water to ensure that the chlorine residual in the test water was not excessively high and did not contribute to early fading of the panels. Upon drainage of the water, each panel was washed, photographed and inspected for signs of colour or surface degradation. After replacement of the water and panel in each tank, the same tablet was replaced in exactly the same location upon the panel surface. Each panel was checked after two hours to ensure that the tablet had not moved from its position.

This process was repeated daily for up to 7 days. The observed appearance of each panel is outlined in Table 2 below:

TABLE 2

| Observed Results after Exposure to Chlorine Tablet | | | | |
|---|---|---|---|---|
| Day | Panel PAC | Panel PBC | Panel PC | Panel PD |
| 1 | Good appearance. Faint tablet outline | Very faint tablet outline | Slight tablet outline visible | Distinct circle shape of tablet |
| 2 | Good. Slight discolouration | No change | Fair, with slight etched surface | Extremely faded and gelcoat surface etched |
| 3 | No visible change | — | No visible change | — |
| 4 | Slight discolouration | — | Tablet area fading & slight etched surface | — |
| 5 | Slight discolouration | — | Faded significant etching of surface | — |
| 6 | — | — | Surface badly etched | — |
| 7 | — | — | Slightly more fading of colour | — |

Panels PBC and PD were removed from the testing program after two days of exposure since panel PD (without the inventive surface composition) had faded and deteriorated beyond repair.

After the fifth day of exposure, panel PAC was removed, cleaned and finely sanded by mild, gentle rubbing of the surface (600 grit wet and dry). This action, which was almost effortless, caused immediate removal of the discolouration. The panel was then polished and returned to the testing process.

A further PAC panel was subjected to the testing process without any intermediate polishing or cleaning.

At the conclusion of the testing process, panel PC was examined, where it was established that the surface was significantly degraded, showing extreme pitting and oxidation of the surface in contact with the tablet. The degree of damage caused to the surface was such that it was irreparable and irreversible.

In contrast, panel PAC showed little change to the surface, other than slight staining from the chlorine (green colour of free available chlorine) and extremely slight surface pitting. No degradation of the actual pigmentation in the panel itself was observed. After mild abrasion with 600 grit wet and dry, the surface pitting and the majority of chlorine discolouration was removed.

The above results demonstrate the ability of the surface composition of the present invention to protect the integrity and colour of the overall structure from degradation by water and chemicals.

Example 2

Advanced Accelerated 80° C. Testing

Panels PAC and PBC as described in Example 1 were subjected to water resistance tests in accordance with "AS/NZS 1838-1994 Swimming pools—premoulded fibre-reinforced plastics—design and fabrication" Standards. This test was chosen so as to subject the panels to an extreme environment, more extreme that that encountered in a natural saltwater environment. The Standard requires that the panels are able to pass 30 days at 80° C. in accordance with the prescribed Degradation Rating (Table E1 from the Standard). Both panels were subjected to the required conditions and passed the test with exceptional results. There was no degradation of the surface and no osmotic blistering. After 75 days there was still no osmotic blistering visible and negligible internal surface degradation.

It is therefore clear that the surface composition of the present invention, having performed excellently in a rigorous test designed for swimming pools, advantageously enables the manufacture of boats and other watercraft that are essentially completely fade resistant, exceeding current industry standards.

Example 3

Product Testing for Weathering and Ultra Violet Resistance

Twelve separate panels were manufactured and tested using the ASTM G154-06 "Standard practice for operating fluorescent light apparatus for UV exposure of non-metallic materials". Control panels manufactured as part of the same sample were also supplied for the purposes of comparison.

Tests were performed by the Polymer Testing Laboratory of the Chisholm Institute in Dandenong Victoria 3175, Australia which is a NATA approved laboratory.

Each panel was exposed to 4 hours of condensation at 50° C. followed by 8 hours of UV-A exposure at 60° C. This pattern was repeated for the duration of a 2000 hour test.

Each panel was given a different identification letter being panels G, H, I, J, K, L, M, N, O, P, Q and R.

Each panel was intrinsically different. Ten panels were manufactured using a surface composition according to an embodiment of the present invention and two panels were comparative.

All twelve panels had varying amounts and/or utilised different ultra violet inhibitors and absorbers.

This particular aspect of the testing was undertaken to address which additives would impart a beneficial effect to the surface composition in relation to the following:

a) ability to be used within the resin matrix and be sprayable and not effect the rheology of the gel coat;
b) not inhibit the curing process;
c) not import any characteristic hue or discolouration to the clear gel coat;
d) not increase the aeration of the gel coat as minute or microscopic air bubbles in sufficient proliferation will cause cloudiness or milkiness in the gel coat;
e) not inhibit the Barcol harshness of the gel coat thus reducing the abrasive resistance and overall durability of the product;
f) provide the optimum weathering resistance and UVA resistance after 2000 hours on ASTM G 154-06;
g) establish optimum additive concentrations;
h) establish the most suitable ratio of UV light absorbers to stabilizers with the gel coat.

The following additives were added to the clear gelcoat barrier layer applied to each panel:

CIBA TINUVIN™ 400

A liquid hydroxyphenyl—triazine (HPT) UV absorber.

CIBA TINUVIN™ 384-2

A liquid UV absorber of the hydroxyphenyl—benzotriazole class.

CIBA TINUVIN™ 123

A liquid HALS stabilizer based on hindered aminoether functionality.

The panels were set up and tested according to ASTM G 154-06 and evaluated after 500 hours, 1000 hours, 1500 hours and 2000 hours.

Table 3 summarises the colour, coatings, additives and results of tests on the twelve panels.

TABLE 3

| | | Results of Weathering and Ultra Violet Testing | | | | | | |
|---|---|---|---|---|---|---|---|---|
| | | Barrier | Under | TINUVIN™ additives wt. % | | | Results 500 hr | |
| Panel | Colour | Layer | Layer | 123 | 3B4-2 | 400 | Appearance | Texture |
| G | Stirling | Iso-NPG | VE | 0.33 | | 0.67 | No change | Smooth but increase in surface friction |

TABLE 3-continued

Results of Weathering and Ultra Violet Testing

| | | | | | | | |
|---|---|---|---|---|---|---|---|
| H | Stirling | Iso-NPG | VE | 0.50 | | 1.00 No change | Smooth but increase in surface friction |
| I | Stirling | Iso-NPG | VE | 0.67 | | 1.33 No change | Smooth but increase in surface friction |
| J | Stirling | Iso-NPG | VE | | 0.33 | 0.67 No change | Smooth but increase in surface friction |
| K | Stirling | Iso-NPG | VE | | 0.5 | 1.00 No change | Smooth but increase in surface friction |
| L | Stirling | Iso-NPG | VE | | 0.67 | 1.33 No change | Smooth but increase in surface friction |
| M | Light Sapphire Blue | Iso-NPG | none | | 0.98 | Pale, small white dots | Smooth but increase in surface friction |
| N | Baltic Blue | Iso-NPG | VE | 0.67 | | 1.33 No change | Smooth but increase in surface friction |
| O | Stirling | Iso-NPG | VE | 1.00 | | 1.00 No change | Smooth but increase in surface friction |
| P | Stirling | Iso-NPG | VE | 0.75 | | 0.75 No change | Smooth but increase in surface friction |
| Q | Stirling | Iso-NPG | VE | 0.5 | | 0.5 No change | Smooth but increase in surface friction |
| R | Silver Mediterranean | Iso-NPG | none | | 0.98 | Dull, with yellow tinge | Smooth but increase in surface friction |

| | Results | | | | | |
|---|---|---|---|---|---|---|
| | 1000 hr | | 1500 hr | | 2000 hr | |
| Panel | Appearance | Texture | Appearance | Texture | Appearance | Texture |
| G | Slight yellow tinge | No change | No change | No change | Slight loss in gloss | No change |
| H | Slight yellow tinge | No change | No change | No change | Slight loss in gloss | No change |
| I | Slight yellow tinge | No change | Slight loss in gloss | No change | Slight cloudy appearance | No change |
| J | Slight yellow tinge | No change | Slight loss in gloss | No change | No change | No change |
| K | Slight yellow tinge | No change | Slight loss in gloss | No change | Slight cloudy appearance | No change |
| L | Slight yellow tinge | No change | Slight loss in gloss | No change | Slight cloudy appearance | No change |
| M | Paler, small white dots | Slightly rough surface | Significantly paler | Rough with chalky residue | Significantly paler | No change |

TABLE 3-continued

Results of Weathering and Ultra Violet Testing

| | | | | | | |
|---|---|---|---|---|---|---|
| N | Slight yellow tinge | No change | Slight loss in gloss | No change | Cloudy appearance | No change |
| O | Slight yellow tinge | No change | Slight loss in gloss | No change | Cloudy appearance | No change |
| P | Slight yellow tinge | No change | Slight loss in gloss | No change | Cloudy appearance | No change |
| Q | Slight yellow tinge | No change | Slight loss in gloss | No change | Loss of gloss/cloudy appearance | Slightly rough |
| R | Dull, with yellow tinge | Slightly rough surface | Significantly paler | Slightly rough with chalky residue | Significantly paler | Rougher, with chalky residue |

Figure 3:
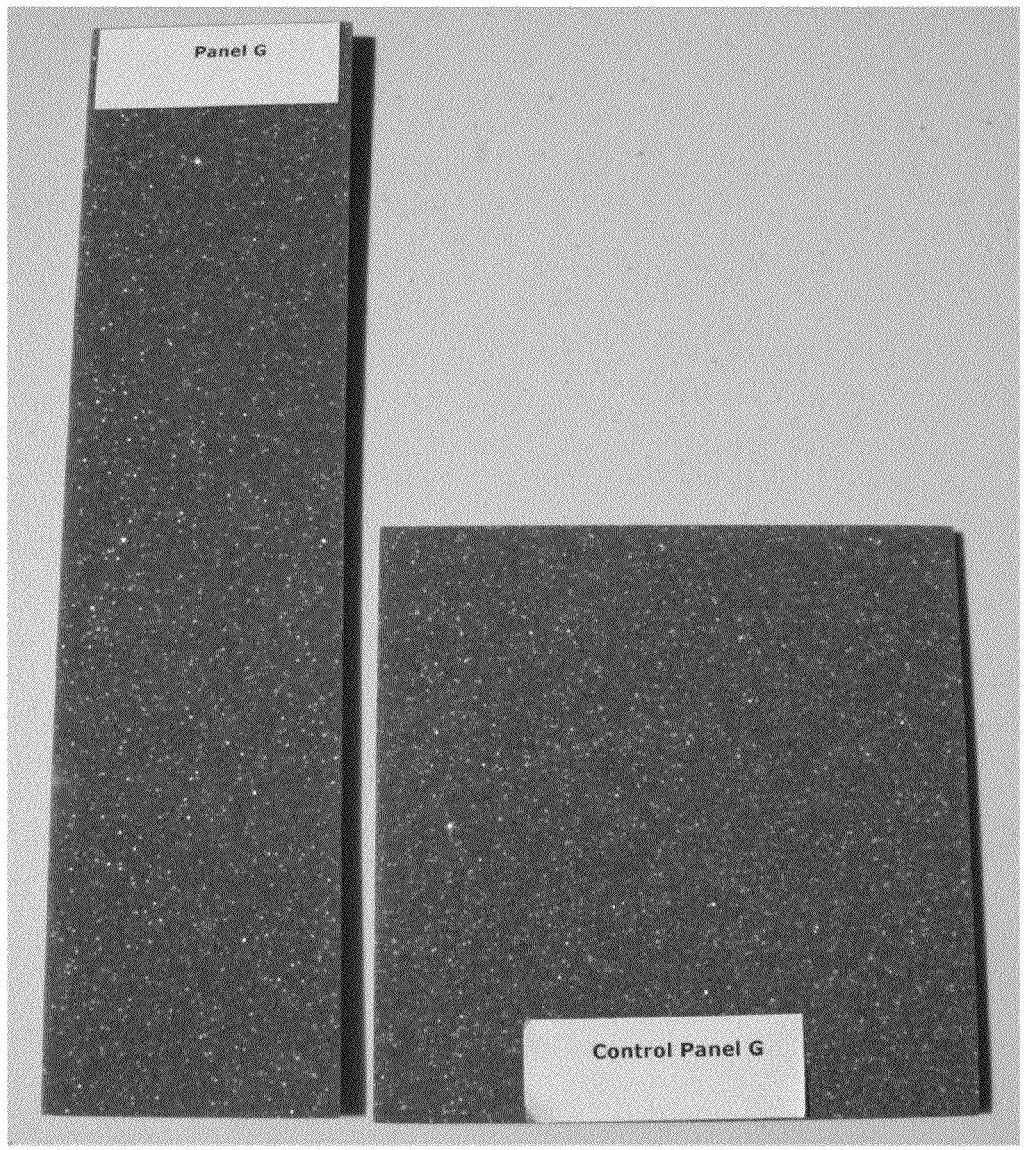
FIGS. 3 to 14 are photographs of a series of test panels comparing weathering resistance.
Figure 4:
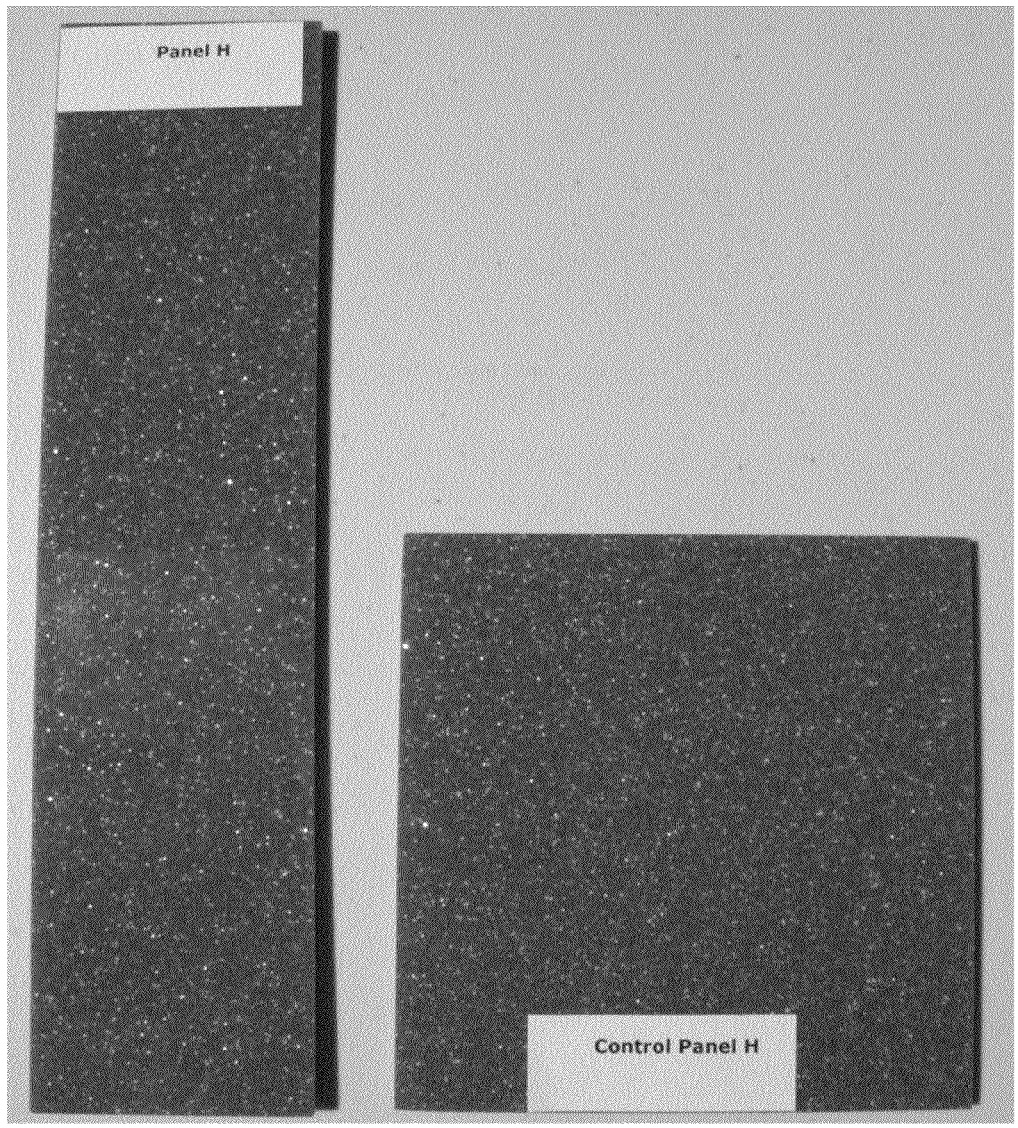
Figure 5:
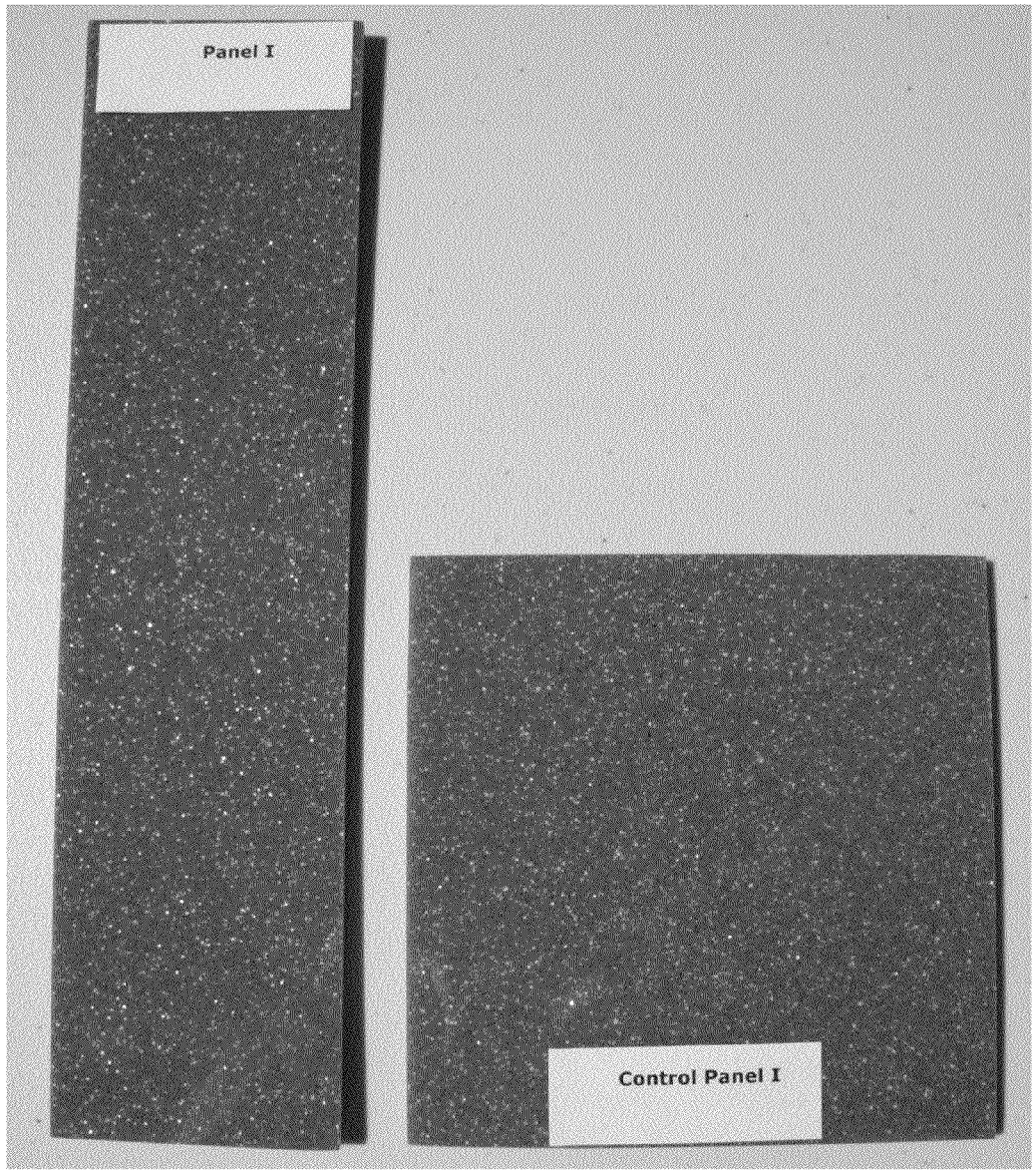
Figure 6:
Figure 7:
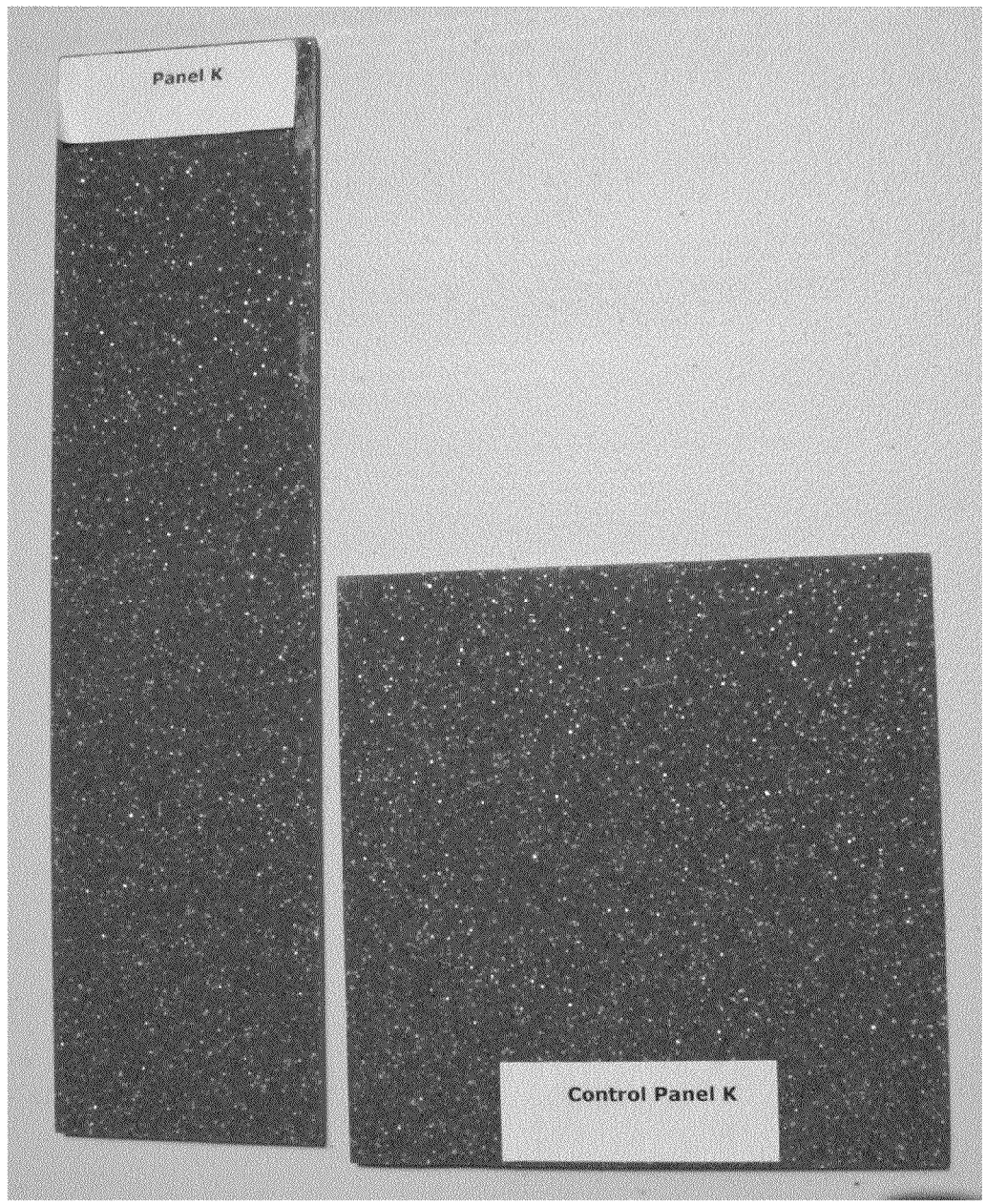
Figure 8:
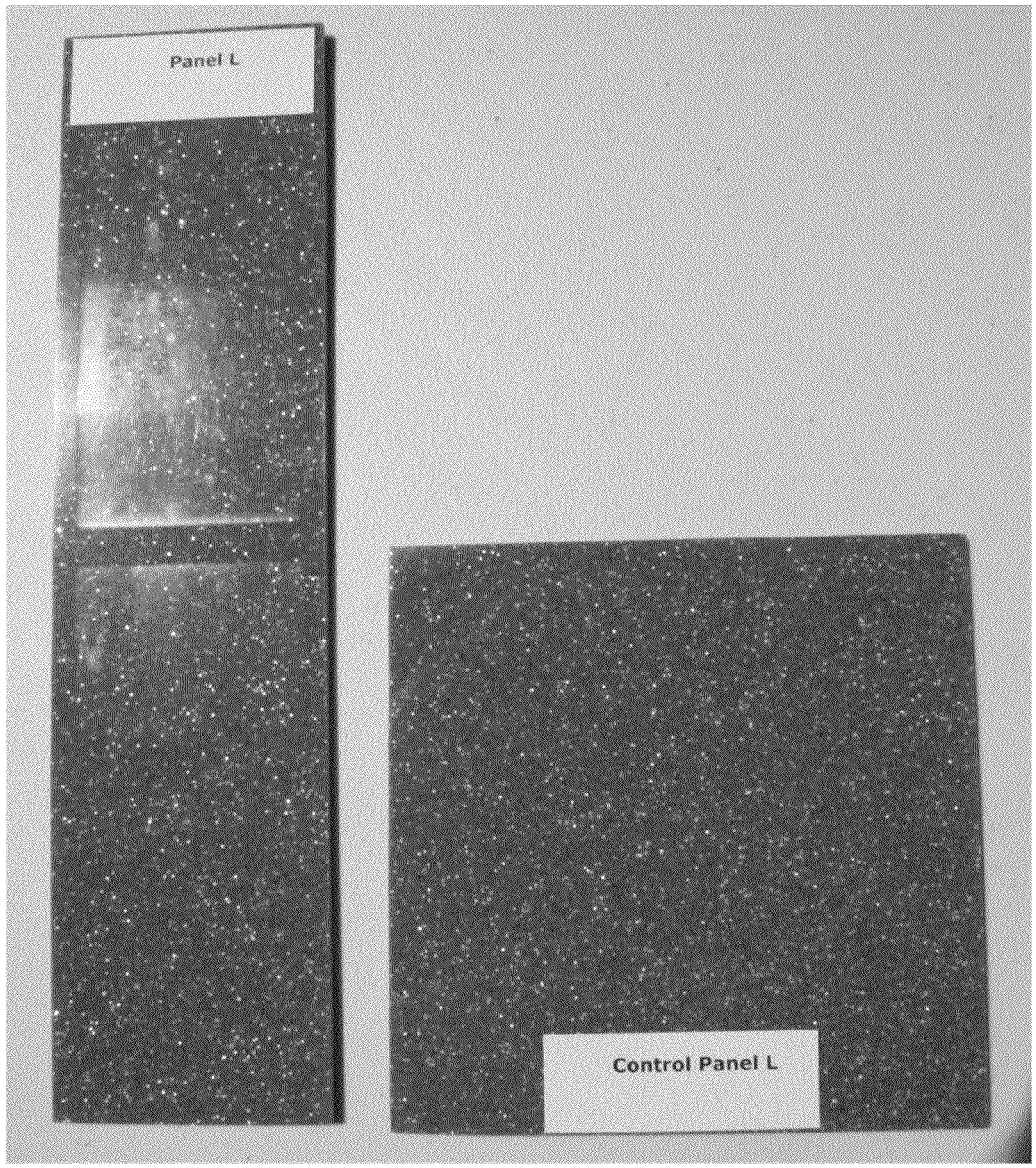
Figure 9:
Figure 10:
Figure 11:
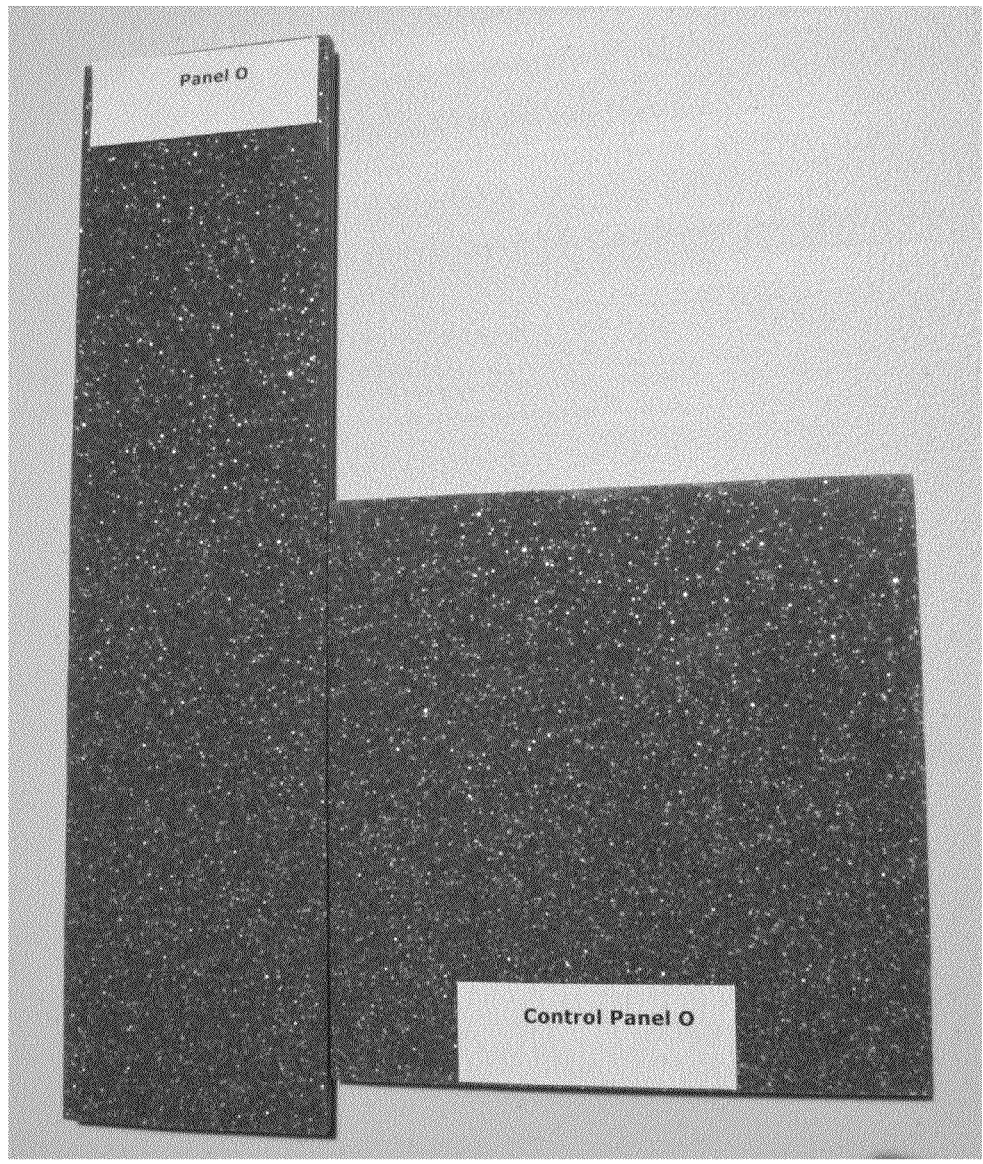
Figure 12:
Figure 13:
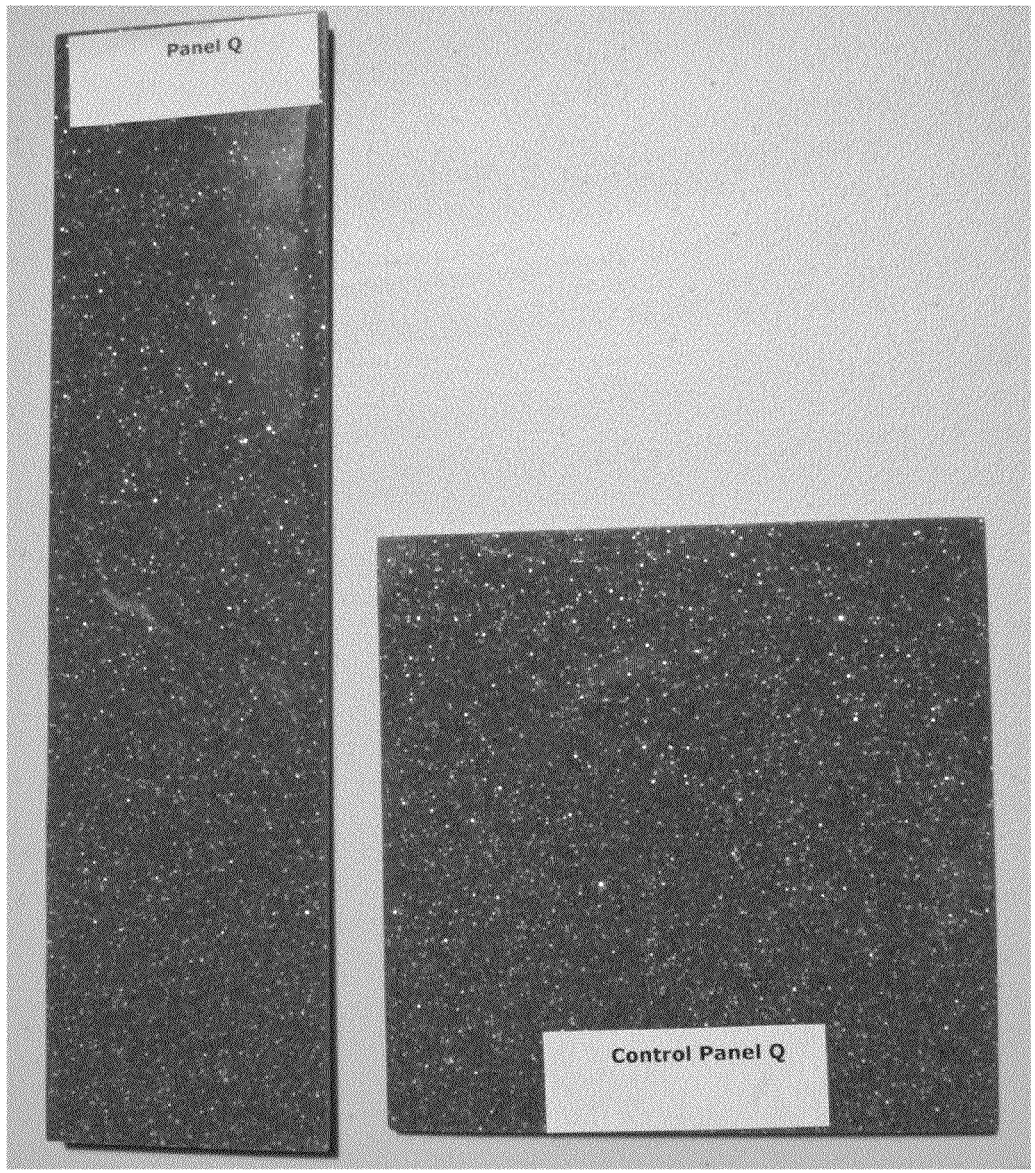
Figure 14:

Panels M and N were almost Identical in colour
Panel R, of Silver Mediterranean colour was almost identical in colour to the Sterling panels.
The description "no change" indicates that there was no change in appearance of the panel from its original state or from the previous inspection
Iso-NPG = isophthalic neopentyl glycol
VE = bisphenol-A epoxy vinyl ester As illustrated in FIGS. 3 to 14 the ten panels with the inventive composition clearly and significantly out performed the two comparative test panels M and R. The following conclusions can be made:
1. Panels M and R showed significant degradation to surface appearance and texture over the course of the tests.
2. The best performing panels were panels G, H, J and K. All showed only slight loss of gloss and a slight yellow tinge. An initial change in surface friction was evident across all panels however panels G, H, J and K all showed no change from the previous test indicating a very slight initial change followed by longer periods of stability and no further change.
3. The panels with higher concentrations of TINUVIN™ additives under performed those with lower concentrations of additives. Accordingly, panels with 1.5% additive outperformed panels with 2.0% additives
4. Panels with 2% additive rate showed a foggy/cloudy appearance.
5. The panels with the ratio of two parts absorber to one part stabilizer out performed the panels with one part absorber to one part stabilizer.
6. There were negligible differences between panels G, H and K.
7. Panel G outperformed panel J indicating that TINUVIN™ 400 offered superior performance to TINUVIN™ 384-2.

Panel H contained 1.5% additives in comparison to Panel G with 1%. As there were not any derogatory effects on Panel H after 2000 hours it was concluded that Panel H would in all probability out perform Panel G under the conditions of ASTM G154-06 for periods longer than 2000 hours.

Overall, it was concluded that the inventive composition offers the following major improvements and benefits over standard coatings particularly when combined with the advantageous characteristics of TINUVIN™ 400 and TINUVIN™ 123 absorbers and stabilizers.

The collective results indicate the following improvements and advantages may result from the use of the surface composition of the present invention:
1. A boat or other watercraft that does not fade and which retains its vivid, brilliant colour for many, many years.
2. No bleach marks, yellowing or chalking.
3. The boat or other watercraft colour is separated from the bleaching effects of chemicals by application of the barrier layer.
4. Brilliant and lasting gloss finish that resists algae, staining and is easier to clean, resulting in less maintenance of the boat or other watercraft.
5. The aesthetic and structural laminates are fully protected from the aggressive nature of water.
6. Excellent inter-laminar adhesion, ensuring all the specific applications of the inventive coating composition and the boat or other watercraft laminates are structurally, mechanically and chemically bonded together, giving the boat or other watercraft greater strength, durability and blister resistance.
7. Improved hydrolytic stability.
8. Chances of "osmotic blistering" are dramatically minimized.
9. Resists degradation by UV light radiation and eliminates a tendency to crack from UV exposure. Has a high thermal stability and is suitable for extreme environmental conditions.

Whilst the surface composition of the present invention finds particular application in the manufacture of boats or other watercraft, it is equally applicable and useful for any product, particularly FRP product, which spends any significant period of time submerged in or exposed to water and/or subjected to UV radiation.

The invention claimed is:
1. A method of manufacturing a surface composition for reducing degradation and fading of surfaces subjected to extended periods of submersion in an aqueous liquid, the method comprising
applying a clear barrier layer to a mould, permitting the clear barrier layer to cure and subsequently applying a colored under layer to the cured clear barrier layer;
wherein the clear barrier layer is in use, disposed atop the colored under layer and in contact with the aqueous liquid, whereby the clear barrier layer protects the structure and appearance of the colored under layer, wherein the clear barrier layer comprises a clear polyester gelcoat, and wherein the clear polyester gelcoat comprises one or more phthalate containing polyesters, vinyl containing polyesters or methyl methacrylate containing polyesters, and wherein the colored under layer comprises one or more polyesters, vinyl esters or terephthalate based resins, and wherein the colored under layer is free of particles and chips.

2. The method according to claim 1 wherein the mould is that of a watercraft.

3. The method according to claim 2, wherein said watercraft is selected from the group consisting of a boat, ship, canoe, kayak, raft, barge, catamaran, yacht, hydrofoil, windsurfer, surfboard, water skis, jet skis, underwater robot and seaplane.

4. The method according to claim 3 wherein said watercraft is at least in part comprised of fibreglass reinforced plastic.

5. The method according to claim 3 wherein the composition further comprises one or more UV inhibitors, absorbers or stabilisers.

6. The method according to claim 3 wherein the clear barrier layer comprises one or more UV inhibitors, absorbers and/or stabilisers.

7. The method according to claim 3 wherein the clear polyester gelcoat comprises a phthalate containing polyester.

8. The method according to claim 3 wherein the clear polyester gelcoat is derived from an isophthalic neopentyl glycol.

9. The method according to claim 8 wherein the clear polyester gelcoat is derived from greater than 70 mole % neopentyl glycol based on the total mole % of dihydroxy compounds in the polyester.

10. The method according to claim 3 wherein the barrier layer comprises a triazine based UV absorber.

11. The method according to claim 3 wherein the barrier layer comprises a hindered amine light stabiliser.

12. The method according to claim 3, wherein the under layer comprises one or more epoxy vinyl esters, brominated epoxy vinyl esters, novolac epoxy vinyl ester resins or elastomer modified vinyl ester resins.

13. The method according to claim 12, wherein the epoxy vinyl ester resin comprises a bisphenol-A epoxy vinyl ester resin.

14. The method according to claim 3 wherein the under layer further comprises one or more metal promoters.

15. The method according to claim 1 wherein the clear barrier layer comprises one or more metal promoters and is free of cobalt promoters.

16. The method according to claim 15 wherein the one or more metal promoters is selected from the group consisting of zinc octoate or potassium octoate.

17. The method according to claim 1 wherein the clear barrier layer comprises mixed metal promoters and is free of cobalt promoters.

18. The method according to claim 1 wherein the clear barrier layer is clear prior to application and remains clear after application and curing.

* * * * *